(12) United States Patent
Kunita et al.

(10) Patent No.: US 8,192,840 B2
(45) Date of Patent: Jun. 5, 2012

(54) SPRING WITH HIGH DURABILITY AND METHOD OF COATING THE SAME

(75) Inventors: Yasuhiko Kunita, Nagoya (JP); Takayuki Sakakibara, Nagoya (JP); Masami Wakita, Nagoya (JP); Yuichi Kondo, Osaka (JP); Norio Sawatari, Nagoya (JP)

(73) Assignees: Chuo Hatsujo Kabushiki Kaisha, Nagoya-shi (JP); Rock Paint Co., Ltd., Osaka-shi (JP)

( * ) Notice: Subject to any disclaimer, the term of this patent is extended or adjusted under 35 U.S.C. 154(b) by 0 days.

(21) Appl. No.: 12/819,821

(22) Filed: Jun. 21, 2010

(65) Prior Publication Data

US 2010/0255296 A1 Oct. 7, 2010

Related U.S. Application Data

(62) Division of application No. 11/627,691, filed on Jan. 26, 2007, now Pat. No. 7,776,440.

(30) Foreign Application Priority Data

Jan. 26, 2006 (JP) ................ 2006-017464

(51) Int. Cl.
*B05D 1/36* (2006.01)
*B05D 1/38* (2006.01)
*B05D 3/02* (2006.01)
*B05D 7/16* (2006.01)
*B32B 15/02* (2006.01)
*C08L 63/00* (2006.01)

(52) U.S. Cl. ........ 428/371; 427/327; 427/386; 427/410; 525/107; 525/109; 525/113; 525/114; 525/120; 525/423; 525/438; 525/454

(58) Field of Classification Search ................ None
See application file for complete search history.

(56) References Cited

U.S. PATENT DOCUMENTS

| | | |
|---|---|---|
| 4,345,004 A | 8/1982 | Miyata et al. |
| 4,624,884 A | 11/1986 | Harada et al. |
| 4,804,581 A | 2/1989 | Geary et al. |
| 4,857,362 A | 8/1989 | Hart |
| 5,981,086 A | 11/1999 | Siminski |
| 6,080,823 A | 6/2000 | Kiriazis |
| 6,491,973 B1 | 12/2002 | Davydov et al. |
| 6,663,968 B2 | 12/2003 | Grubb et al. |
| 2003/0207026 A1 | 11/2003 | Wesch et al. |
| 2004/0101670 A1 | 5/2004 | Grubb et al. |
| 2007/0116963 A1 | 5/2007 | Sakakibara |
| 2008/0102283 A1 | 5/2008 | Momiyama et al. |

FOREIGN PATENT DOCUMENTS

| | | |
|---|---|---|
| DE | 2028060 | 12/1971 |
| JP | 57-158271 A | 9/1982 |
| JP | 11-80610 | 3/1999 |
| JP | 2001-172563 A | 6/2001 |
| WO | 03/093375 A1 | 11/2003 |
| WO | WO 03/093375 A1 * | 11/2003 |
| WO | WO 2005/057043 A1 * | 6/2005 |

OTHER PUBLICATIONS

Derwent accession No. 2005-488213 for WO 2005/057043 and U.S. 2007/0116963, Kunida et al., Jun. 23, 2005, two pages.*
Modaflow Resin Flow Modifiers: Properties & Uses, Solutia, Inc., 2000, 32 pages.*
Derwent accession No. 1971-80481S for German Patent No. 2,028,060, Metallegesellschaft AG, Dec. 16, 1971, one page.
CAPLUS accession No. 1972:101364 for German Patent No. 2,028,060, Metallegesellschraft AG, Dec. 16, 1971. one page.

* cited by examiner

*Primary Examiner* — Robert Sellers
(74) *Attorney, Agent, or Firm* — Oblon, Spivak, McClelland, Maier & Neustadt, L.L.P.

(57) ABSTRACT

A spring with high durability has a coating film composed of an epoxy resin powder coating containing softening agent which contains an epoxy resin and a softening agent comprising a thermoplastic resin for improving impact resistance of the coating film. A method of coating a spring with high durability comprises a coating step of making an epoxy resin powder coating containing softening agent which contains an epoxy resin and a softening agent comprising a thermoplastic resin for improving impact resistance of a coating film adhere to a surface on which the coating film is formed, and a baking step of baking the epoxy resin powder coating containing softening agent adhered to the surface.

32 Claims, 1 Drawing Sheet

[Fig1]
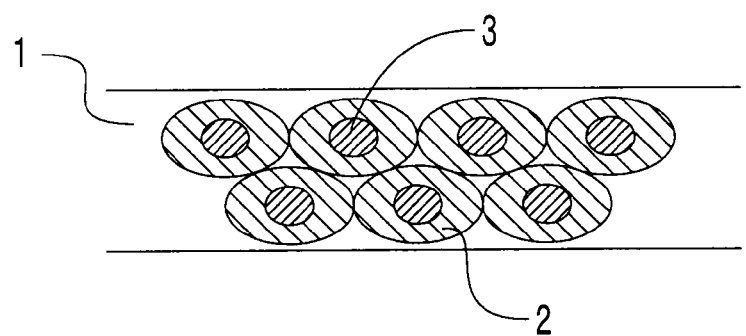
[Fig2]
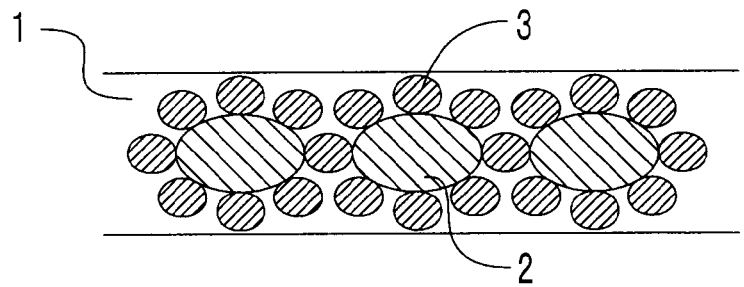

SPRING WITH HIGH DURABILITY AND METHOD OF COATING THE SAME

The present application is a Divisional application of U.S. Ser. No. 11/627,691 filed Jan. 26, 2007, now U.S. Pat. No. 7,776,440, which claims priority to Japanese Patent Application 2006-17464.

BACKGROUND OF THE INVENTION

1. Field of the Invention

The present invention relates to a spring with high durability, which is excellent in corrosion resistance and chipping resistance, and a method of coating the same.

2. Description of the Related Art

Various kinds of suspension springs have been used in motor vehicles, railroad vehicles and so on. Many of these suspension springs are made of steel, and coating adapted to impart corrosion resistance thereto has been normally applied to surfaces thereof. However, when the motor vehicles and so on are running, pebbles and gravels spattered by their wheels strike the suspension springs to cause peeling of coating films due to striking impact, that is the so-called chipping. As a result, uncoated surfaces (basis materials) of the suspension springs become exposed, and rust is formed at portions where uncoated surfaces become exposed. Accordingly, having high chipping resistance as well as providing high corrosion resistance is required to coating of the suspension springs.

On the other hand, coating composed of a plurality of layers has been applied to bodies of motor vehicles, considering corrosion resistance, chipping resistance, appearance of bodies and so on. The bodies of the motor vehicles and the suspension springs, however, differ from each other in composition, strength and so on. And, great distortions are generated in the suspension springs due to deformations thereof. Consequently, the suspension springs require a special coating exhibiting corrosion resistance and chipping resistance.

From these viewpoints, for example, U.S. Pat. No. 5,981,086 discloses the technique of imparting corrosion resistance and chipping resistance to a high-tensile steel by applying a two-layered coating including a first layer composed of a thermosetting epoxy which contains zinc with a predetermined ratio, and a second layer composed of an ethylene/acrylic copolymer. Furthermore, U.S. Pat. No. 6,663,968 discloses the attempt of adding fibers and foaming agents to a topcoat layer not including zinc in a two-layered coating for high-tensile steel.

Normally, as a measure for improving chipping resistance of a coating film, to make the coating film thick is proposed. However, when the coating film is made to thick, internal stress increases, and the coating film is easily peeled off. Furthermore, the cost increases. On the other hand, in consideration of the use in cold districts, corrosion resistance and chipping resistance at low temperatures become a big problem. However, by a method of coating disclosed in U.S. Pat. No. 5,981,086 and U.S. Pat. No. 6,663,968, a coating film having a desired performance cannot be obtained.

SUMMARY OF THE INVENTION

The present invention has been made after consideration of these circumstances, and has an object of providing a spring with high durability, which is excellent in corrosion resistance and chipping resistance, even if the thickness of the coating film is thin. In addition, the present invention has an object of providing a coating method for realizing such a spring.

A first spring with high durability of the present invention is characterized in that it has a coating film composed of an epoxy resin powder coating containing softening agent which contains an epoxy resin and a softening agent comprising a thermoplastic resin for improving impact resistance of the coating film.

The softening agent enhances flexibility of the coating film, and improves impact resistance of the coating film. To "improve impact resistance of the coating film" which is the function of the softening agent means that the impact resistance of the coating film is improved, as compared with the embodiment which doesn't contain a softening agent. The impact resistance of the coating film is evaluated, for example, by an impact resistance test such as JIS K 5600 5-3 and so on.

The coating film formed on the first spring with high durability of the present invention contains the above softening agent, and has high impact resistance. So, it has high chipping resistance. Especially, even at low temperatures such as approximately −30° C., the coating film exhibits high chipping resistance. Consequently, when the thickness of the coating film is thinner than that of a conventional coating film, it is endurable for practical use. Thus, in the first spring with high durability of the present invention on which the coating film having high chipping resistance is formed, even when pebbles and gravels strike, the coating film is hardly peeled off, and exposure of an uncoated surface is suppressed. Therefore, the first spring with high durability of the present invention is hardly corroded, and it has high durability.

A second spring with high durability of the present invention is characterized in that it has a two-layered coating film comprising an undercoat layer and a topcoat layer which is formed on the undercoat layer, and at least one of the two layers is composed of an epoxy resin powder coating containing softening agent which contains an epoxy resin and a softening agent comprising a thermoplastic resin for improving impact resistance of the coating film.

The second spring with high durability of the present invention is coated with the two-layered coating film comprising the undercoat layer and the topcoat layer. So, an uncoated surface is hardly exposed, as compared with a coating film of a single layer. In addition, at least one of the two layers is composed of the above mentioned epoxy resin powder coating containing softening agent, and it has high chipping resistance. Therefore, the second spring with high durability of the present invention is hardly corroded, and it has high durability.

A method of coating a first spring with high durability of the present invention is characterized in that it comprises: a coating step of making an epoxy resin powder coating containing softening agent which contains an epoxy resin and a softening agent comprising a thermoplastic resin for improving impact resistance of a coating film adhere to a surface on which the coating film is formed; and a baking step of baking the epoxy resin powder coating containing softening agent adhered to the surface.

In the method of coating of the present invention, the epoxy resin powder coating containing softening agent adhered to the surface in the coating step is heated in the baking step, so it is melted and cured to form the coating film. Thus, according to the method of coating of the present invention, the above first spring with high durability of the present invention can be readily produced.

By the way, "a surface on which the coating film is formed" means a surface on which a coating film of an epoxy resin powder coating containing softening agent is formed. Therefore, "a surface on which the coating film is formed" includes an uncoated surface of a spring. In addition, when a film composed of phosphate such as zinc phosphate and so on is formed on the uncoated surface of the spring, the surface of the film is included. Furthermore, when a coating film of the epoxy resin powder coating containing softening agent is formed on the previously-formed coating film, the surface of the previously-formed coating film is included.

A method of coating a second spring with high durability of the present invention is characterized in that it comprises: an undercoating step of making a powder coating for undercoating adhere to a surface of said spring; a topcoating step of making a powder coating for topcoating adhere to an undercoat film composed of the powder coating for undercoating; and a baking step of baking the undercoat film and the powder coating for topcoating adhered to the undercoat film; and at least one of the powder coating for undercoating and the powder coating for topcoating is an epoxy resin powder coating containing softening agent which contains an epoxy resin and a softening agent comprising a thermoplastic resin for improving impact resistance of a coating film.

In accordance with the coating method of the present invention, the second spring with high durability of the present invention can be readily produced. Namely, with the coating method of the present invention, in the undercoating step, the powder coating for undercoating adapted to form the undercoat layer is made to adhere, and in the topcoating step, the powder coating for topcoating adapted to form the topcoat layer is made to adhere. By heating the coatings which have adhered in respective steps, they are melted and cured to form respective layers.

Here, at least one of the powder coating for undercoating and the powder coating for topcoating is an epoxy resin powder coating containing softening agent. So, chipping resistance of the formed coating film is high, and it is possible to make the coating film thin. When the coating film is made to thin, adhesion of the two layers is improved. Furthermore, an amount of coating to be used can be decreased, and the cost of coating can be reduced. Normally, in the step in which a powder coating is made to adhere, the powder coating is melted and adhered, so it is often that the step is carried out under the condition that the spring has a relatively high temperature. In the process of coating of the present invention, by making the coating film thin, the undercoating step and the topcoating step can be carried out at the temperature which is lower than that of the conventional temperature.

The coating method of the present invention includes a baking step after the topcoating step. The curing conditions of the coatings are, however, not limited specifically. Namely, the curing condition of the coating such as 2 coating 2 baking of heating adhered coatings for baking after both the undercoating step and the topcoating step, and 2 coating 1 baking of heating adhered coatings for baking only after the topcoating step and so on can be arbitrarily selected. Therefore, "undercoat film" in the topcoating step and the baking step of the present coating method can take various states, depending on the temperature of an object to be coated (spring) in the undercoating step, and depending on whether or not the heating is carried out thereafter. Namely, as explained later in detail, "undercoat film" may take any state in which the powder coating for undercoating remains adhered thereto, is under curing or has been cured.

The spring with high durability of the present invention is useful for motor vehicles, railroad vehicles and so on, especially, it is suitable for suspension of automobiles.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIG. 1 is a pattern diagram for illustrating a constitution of coating of a powder coating which is produced by a melting kneading method.

FIG. 2 is a pattern diagram for illustrating a constitution of coating of a powder coating which is produced by a dry blend method.

DETAILED DESCRIPTION OF THE PREFERRED EMBODIMENTS

Hereinafter, the spring with high durability and the method of coating the same of the present invention will be explained in detail.

(Spring with High Durability)

A first spring with high durability of the present invention is characterized in that it has a coating film composed of an epoxy resin powder coating containing softening agent which contains an epoxy resin and a softening agent comprising a thermoplastic resin for improving impact resistance of the coating film.

It is enough for the first spring with high durability of the present invention to have a coating film composed of an epoxy resin powder coating containing softening agent. Therefore, it is possible to adopt various kinds of embodiments such as an embodiment in which a coating film composed of an epoxy resin powder coating containing softening agent is formed as a single-layered condition, an embodiment in which the above coating films are formed as a two- or more-layered condition, and an embodiment in which the above coating film and other coating film are laminated. For example, as an embodiment of a two-layered coating film, the second spring with high durability of the present invention is mentioned. Namely, the second spring with high durability of the present invention is a spring with high durability having a two-layered coating film comprising an undercoat layer and a topcoat layer which is formed on the undercoat layer, and at least one of the two layers is composed of an epoxy resin powder coating containing softening agent which contains an epoxy resin and a softening agent comprising a thermoplastic resin for improving impact resistance of the coating film.

Hereinafter, first, the first spring with high durability and the second spring with high durability of the present invention will be explained together. Then, an additional explanation of the second spring with high durability of the present invention will be done. By the way, in the following explanation, the first spring with high durability and the second spring with high durability of the present invention will be referred to as "the spring with high durability of the present invention" together.

In the spring with high durability of the present invention, the configuration of the spring to be coated is not limited specifically, and springs with various configurations such as coil springs, leaf springs, stabilizers, torsion bars and so on can be used. The material for the spring is not limited specifically, provided that it is composed of a metal, and examples of the preferred material include spring steel which has been normally used for the springs and so on. For example, the spring steel and so on may be subjected to shot peening and so on to adjust the surface roughness, after hot formed or cold formed.

And it is desirable to previously form a film composed of phosphate such as zinc phosphate, iron phosphate etc. on the surface of the spring, which is adapted to be coated. When the coating films are formed on the phosphate film, the corrosion resistance and the adhesion of the coating films are further improved. In this case, it is effective that the phosphate film covers 80% or more of the surface area of the spring. In particular, when phosphate is zinc phosphate, the corrosion resistance is further improved.

The film weight of the formed phosphate film is not limited specifically. Normally, to impart corrosion resistance by the phosphate film, the film weight of approximately 1.8 to 2.3 g/m² has been needed. On the other hand, as the film weight decreases, the adhesion of the coating film increases. Therefore, the film weight may be determined to 2.2 g/m² or less in view of the adhesion thereof. The film weight is obtained by measuring the weight of the formed film, and alternatively, when the film is formed by the spray method, the film weight may be obtained by converting from the outlet amount of a spray gun.

Moreover, for example, crystals of zinc phosphate in the phosphate film is composed of $Zn_3(PO_4)_2 \cdot 4H_2O$ (orthorhombic) and $Zn_2Fe(PO_4)_2 \cdot 4H_2O$ (monoclinic). The configuration and dimensions of these phosphate crystals affect the corrosion resistance and the adhesion of the coating film. In order to further improve the corrosion resistance and the adhesion, it is desirable that the crystal configuration of the phosphate is similar to a spherical configuration, and it is preferable that the average diameter of each crystal is 3 μm or less. In this case, the average diameter of the crystals may be measured by observing the phosphate film with the scanning electron microscope (SEM) and so on. In the present specification, the average diameter of the major axis of each crystal observed with SEM is adopted as the average diameter.

For example, as the second spring with high durability of the present invention, it is preferable that a phosphate film is formed under the undercoat layer, the film weight of the phosphate film is 2.2 g/m² or less and the average diameter of the phosphate crystal is 3 μm or less.

The epoxy resin powder coating containing softening agent used for the spring with high durability of the present invention contains the epoxy resin and the softening agent. The epoxy resin acts as a base resin which is the base for forming the coating film. Examples of the epoxy resin include bisphenol A type epoxy resin, bisphenol F type epoxy resin, crystalline epoxy resin and so on. One of these epoxy resins may be used alone, or a mixture of two or more epoxy resins may be used. It is desirable that the epoxy equivalent weight of the epoxy resin is 500 or more and 2500 or less. When the epoxy equivalent weight is less than 500, the epoxy resin is in a liquid state so as not to be suited to the preparation of the powder coating. On the other hand, when the epoxy equivalent weight exceeds 2500, the melt viscosity increases so as not to be suited to the preparation of the powder coating. From the viewpoint of improving the flexibility of the coating film, it is preferable that the epoxy equivalent weight is 800 or more and 1000 or less.

As the thermoplastic resin used as a softening agent, for example, it is preferable to use one or more of resin selected from the group consisting of a urethane resin, an acrylic resin, a polyamide resin and polyolefin resin. Concretely speaking, urethane beads, acrylic beads, polyamide beads, polyethylene beads and so on may be used. By using the thermoplastic resin in the condition of beads, the internal stress of the coating film can be loosened, and the flexibility of the coating film can be further obtained.

The diameter of each kind of beads is not limited specifically. Beads which are easily available, for example, urethane beads having an average particle diameter of 10 to 150 μm, acrylic beads having an average particle diameter of 0.3 to 150 μm, polyethylene beads having an average particle diameter of 10 to 80 μm and so on may be used.

In order to demonstrate the effect for improving the impact resistance of the coating film effectively, it is desirable that the content of the softening agent is 5 wt % or more to 100 wt % of the total weight of the epoxy resin powder coating containing softening agent. It is more preferable that the content of the softening agent is 7.5 wt % or more. On the other hand, in consideration of the degradation of materiality of the coating film caused by adding the softening agent excessively, it is preferable that the content of the softening agent is 15 wt % or less. It is more preferable that the content of the softening agent is 12.5 wt % or less.

The epoxy resin powder coating containing softening agent may be produced by well-known methods such as a melting kneading method, a dry blend method and so on. Among these methods, in order to exhibit the characteristics of the softening agent, namely, to improve the impact resistance of the coating film, at the maximum, it is desirable to adopt a dry blend method. The dry blend method is the method in which materials constituting the powder coating are mechanically mixed. FIG. 1 shows a pattern diagram for showing the constitution of the coating when it is produced by the melting kneading method. FIG. 2 is a pattern diagram for showing the constitution of the coating when it is produced by the dry blend method. As shown in FIG. 1, when the melting kneading method is adopted, a softening agent 3 is enclosed in a base resin 2 of a powder coating 1. On the other hand, as shown in FIG. 2, when the dry blend method is adopted, the softening agent 3 exists between the base resin 2 and the base resin 2. Therefore, when the powder coating which is produced by the dry blend method is used, the softening agent existing between the base resins acts as a cushion, so the impact resistance of the coating film is further improved.

The epoxy resin powder coating containing softening agent contains a curing agent which is normally used in powder coating as the coating film forming component, in addition to the above-described epoxy resin and softening agent. Examples of the curing agent include aromatic amine, acid anhydride, derivative of dicyandiamide, derivative of organic acid dihydrazide, phenol resin and so on.

The epoxy resin powder coating containing softening agent may contain other resins except the epoxy resin. For example, in consideration of antiweatherability, it is preferable that a polyester resin is contained in addition to the epoxy resin. In this embodiment, the polyester resin is a base resin, and the epoxy resin acts as a curing agent. Namely, the epoxy resin powder coating containing softening agent is cured with the reaction of the epoxy resin and the polyester resin. Thus, in the present specification, "epoxy resin powder coating containing softening agent" also includes the embodiment in which an epoxy resin is contained, but the epoxy resin doesn't act as a base resin.

The composition ratio of the epoxy resin and the polyester resin is not limited specifically, but, for example, it is desirable to be determined to 1:1 in equivalent weight ratio. Examples of the polyester resins in the present coating include the resins obtained by ester interchange and polycondensation reaction of alcohols such as ethylene glycol, diethylene glycol, triethylene glycol, propanediol, butanediol, pentanediol, hexanediol and so on, and carboxylic acids such as terephthalic acid, maleic acid, isophthalic acid, succinic acid, adipic acid, sebacic acid and so on. One of these resins may be used alone, or a mixture of two or more thereof may be used.

The epoxy resin powder coating containing softening agent may contain various additives as required in addition to the above materials. Examples of the additives include zinc for preventing rust, various pigments, a surface adjusting agent adapted to adjust the surface tension of coating, an oxidant inhibitor for resin, an antistatic agent, fire retardant and so on. By the way, the method of forming the coating film will be explained in the following explanation of the coating method.

In the spring with high durability of the present invention, the thickness of the coating film which is formed by the epoxy resin powder coating containing softening agent is not limited specifically. The thickness of the coating film may be appropriately adjusted depending on the kinds of coating film or the number of layers of coating film which is formed on the spring. For example, in the first spring with high durability of the present invention in which the coating film is formed as a single-layered condition, it is desirable that the thickness of the coating film is 400 μm or more in order to obtain sufficient chipping resistance. It is more preferable that the thickness of the coating film is 500 μm or more.

In the spring with high durability of the present invention, the coating film containing the softening agent is formed. Due to this, the roughness of the uppermost surface becomes rough as compared with a spring in which only a coating film not containing a softening agent is formed. A preferable embodiment of a spring with high durability of the present invention is, for example, an embodiment in which the roughness in axial direction is $R_{zjis}$5 μm or more and the roughness in circumferential direction is $R_{zjis}$10 μm or more. The term "$R_{zjis}$" is a 10-point average roughness. Furthermore, when it is shown as an arithmetic average roughness ($R_a$), an embodiment in which the roughness in both axial direction and circumferential direction is $R_a$1 μm or more is preferable. By the way, the upper limit of the surface roughness is preferably $R_a$120 μm or less and $R_{zjis}$120 μm or less in both axial direction and circumferential direction. In the present specification, as the surface roughness in axial direction, the value in which the uppermost surface of the spring is measured in axial direction by a laser-type surface roughness gauge is adopted. In addition, as the surface roughness in circumferential direction, the value in which the uppermost surface of the spring is measured in circumferential direction by a laser-type surface roughness measure is adopted.

Next, the second spring with high durability of the present invention will be explained. As above described, the second spring with high durability has a two-layered coating film comprising an undercoat layer and a topcoat layer, and at least one of the two layers is composed of an epoxy resin powder coating containing softening agent. Concretely speaking, there are embodiments such as an embodiment in which only the undercoat layer is composed of an epoxy resin powder coating containing softening agent, an embodiment in which only the topcoat layer is composed of an epoxy resin powder coating containing softening agent, and an embodiment in which both the undercoat layer and the topcoat layer are composed of an epoxy resin powder coating containing softening agent. In the embodiment in which a softening agent is contained in both of two layers, the chipping resistance and the corrosion resistance of the coating layer is further improved. Furthermore, in the above two embodiments in which only one layer is composed of an epoxy resin powder coating containing softening agent, the other layer is formed by using a normal powder coating in which an epoxy resin, a polyester resin and so on are used.

As for the second spring with high durability of the present invention, it is desirable that zinc is contained in the undercoat layer, from the viewpoint of preventing rust. However, by containing zinc, the flexibility of the undercoat layer is degraded. Therefore, it is effective that a softening agent is contained in order to improve the chipping resistance of the coating film. Namely, as for the second spring with high durability of the present invention, it is desirable that the undercoat layer is composed of an epoxy resin powder coating containing softening agent which contains zinc. In this case, in order to obtain excellent effect for preventing rust, it is preferable that the content of zinc is 75 wt % or more to 100 wt % of the total weight of the epoxy resin powder coating containing softening agent.

And it is desirable that the topcoat layer contains various pigments such as a color pigment, extender pigment and so on. Examples of the color pigment include an inorganic type pigment such as carbon black, titanium dioxide, colcothar, ocher and so on, and an organic type pigment such as quinacridone red, phthalocyanine blue, benzidine yellow and so on. And examples of the extender pigment include calcium carbonate, magnesium carbonate, talc, silica, barium sulfate and so on.

In particular, the extender pigment is important, because it affects the mechanical properties of the coating film. For example, when the diameter of particles composing the extender pigment is small, the mechanical properties such as flexing properties of the coating film are improved, and consequently, the chipping resistance is improved. For example, when calcium carbonate is used as the extender pigment, it is desirable to determine the average particle diameter thereof to 0.5 μm or more and 1 μm or less. Furthermore, the impact resistance and so on of the coating film change with the configuration of the particles, such as a scaled configuration, irregular configuration, needle-shaped configuration and so on. From the viewpoint of improving the chipping resistance, it is desirable to use the extender pigment with a needle-shaped or irregular configuration.

The pigment content is not limited specifically, but from the viewpoint of the hiding properties, for example, it is desirable that the pigment content is 2 wt % or more to 100 wt % of the total weight of the coating. On the other hand, considering the dispersing properties of the pigment, it is desirable that the pigment content is 60 wt % or less to 100 wt % of the total weight of the powder coating.

The undercoat layer and the topcoat layer may use the same or different resin for constituting the coating film. For example, when the two layers include resins of the same kind, the adhesion between two layers is high. Therefore, if a great distortion peculiar to the spring is generated, two layers are difficult to peel off each other, and consequently, following characteristics against the deformation of the spring are excellent. Especially, when an epoxy resin is used as a base resin for the two layers, the flexibility of the coating layer is further increased, and the chipping resistance is further improved. Furthermore, in consideration of antiweatherability, it is preferable that a polyester resin is used as a base resin for the topcoat layer.

The thickness of the coating layer is not limited specifically. For example, from the viewpoint of imparting sufficient corrosion resistance, it is desirable that the thickness of the undercoat layer is 50 μm or more. It is more preferable that the thickness of the undercoat layer is 60 μm or more. Furthermore, the thickness of the topcoat layer is not limited specifically. In the second spring with high durability of the present invention, at least one of the two layers contains a softening agent, so high chipping resistance is shown. Therefore, it is possible to make the film thinner than that of a conventional coating film. For example, it is preferable that the thickness of the topcoat layer is 200 μm or more and 600 μm or less. It is more preferable that the thickness of the topcoat layer is 400

μm or less. By the way, a method of forming each layer will be explained in the following explanation about a method of coating.

(Method of Coating a Spring with High Durability)

A first method of coating a spring with high durability comprises a coating step of making an epoxy resin powder coating containing softening agent adhere to a surface on which a coating film is formed, and a baking step of baking the epoxy resin powder coating containing softening agent adhered to the surface. Furthermore, a second method of coating a spring with high durability comprises an undercoating step of making a powder coating for undercoating adhere to a surface of the spring, a topcoating step of making a powder coating for topcoating adhere to an undercoat film composed of the powder coating for undercoating, and a baking step of baking the undercoat film and the powder coating for topcoating adhered to the undercoat film. Both methods of coating have a common point that the powder coating is made to adhere to the surface on which the coating film is formed (including the surface of the spring and the undercoat film) and baked. Namely, at least one of the undercoating step and the topcoating step in the second method of coating of the present invention corresponds to the first method of coating of the present invention. Therefore, hereinafter, as for the second method of coating the spring with high durability of the present invention, an embodiment in which both of the powder coating for undercoating and the powder coating for topcoating are an epoxy resin powder coating containing softening agent will be explained as merely one example.

(1) Undercoating Step

The present step is the step of making an epoxy resin powder coating containing softening agent for undercoating adhere to a surface of a spring. The configuration, material and so on of the spring to be coated are not limited specifically, and correspond to the above-described spring with high durability of the present invention. And the term "a surface of a spring" means not only an uncoated surface of a spring but also a surface of a film of phosphate such as zinc phosphate, iron phosphate and so on when it is formed on the uncoated surface of the spring. In order to further improve the corrosion resistance and the adhesion of the coating film, it is desirable to previously form the phosphate film. In this case, the coating method of the present invention may include a pretreating step of previously forming the phosphate film on the uncoated surface of the spring, prior to the present step.

The formation of the phosphate film in the pretreating step may be carried out in a well known method. For example, the dipping method of dipping the spring in a bath of a solution of phosphate, the spraying method of spraying a solution of phosphate on the spring with a spray gun and so on or other method will do. Furthermore, the film weight of the formed phosphate film, the kind, the crystal configuration and so on of phosphate correspond to the above-described spring with high durability of the present invention.

The epoxy resin powder coating containing softening agent for undercoating used in the present step is the same as explained above (Spring with high durability). Namely, it is desirable that the epoxy resin powder coating containing softening agent for undercoating contains zinc and a predetermined curing agent in addition to an epoxy resin and a softening agent. In the present step, the epoxy resin powder coating containing softening agent may be made to adhere to the surface of the spring with a normally available method for powder coating, such as the electrostatic coating method, the electrostatic fluidization dipping method, the fluidization dipping method and so on.

In order to improve adhesiveness of an epoxy resin powder coating containing softening agent for undercoating to the surface of the spring, it is desirable that the spring is heated to the predetermined temperature and is made to adhere to the surface in the state that the powder coating is melted. Due to this, it is desirable that the present step includes a preheating step of preheating the spring prior to the present step. In this case, it is preferable that the preheating temperature is 70° C. or above and 180° C. or below. By residual heat in the preheating step, the curing of the epoxy resin powder coating containing softening agent adhered to the surface of the spring proceeds in the undercoating step. After the curing of the epoxy resin powder coating containing softening agent is made to proceed to some degree previously, the subsequent topcoating step is carried out, so adhesion between the undercoat layer and the topcoat layer is improved. When the above-described pretreating step is carried out prior to the undercoating step, the preheating step may be carried out after the pretreating step. Furthermore, the preheating step may be carried out also for drying the spring after washing.

The method of coating of the present invention may include an underbaking step, in which the adhered epoxy resin powder coating containing softening agent for undercoating is heated at the predetermined temperature to be baked, after the present step. The baking temperature in the underbaking step is 60° C. or above and 220° C. or below, which is the same as that of a baking step which will be explained later. It is preferable that the time for baking is approximately 20 minutes.

(2) Topcoating Step

The present step is the step of making an epoxy resin powder coating containing softening agent for topcoating adhere to the undercoat film. As described above, the "undercoat film" to which the epoxy resin powder coating containing softening agent for topcoating is made to adhere in the present step can take various states depending on the temperature of a spring in the undercoating step, and depending on whether or not the heating is carried out thereafter. Namely, when an underbaking step of heating the adhered epoxy resin powder coating containing softening agent for undercoating to complete curing of the powder coating is included between the undercoating step and the present step (2 coating 2 baking), "undercoat film" becomes the film in which the epoxy resin powder coating containing softening agent is cured. And when the undercoating step is carried out under the condition that the spring has a relatively high temperature to make the curing of the adhered epoxy resin powder coating containing softening agent for undercoating proceed (2 coating 1.5 baking), "undercoat film" becomes the film in which the epoxy resin powder coating containing softening agent is on the way of being cured (film in a semi-cured state). On the other hand, when the present step is carried out without making the curing of the adhered epoxy resin powder coating containing softening agent for undercoating proceed in the undercoating step (2 coating 1 baking), "undercoat film" becomes the film in which the epoxy resin powder coating containing softening agent remains adhered thereto.

The epoxy resin powder coating containing softening agent for topcoating used in the present step is the same as explained above (Spring with high durability). For example, it is desirable that the epoxy resin powder coating containing softening agent for topcoating contains a polyester resin and a predetermined pigment in addition to an epoxy resin and a softening agent, or that the epoxy resin powder coating containing softening agent for topcoating contains a curing agent and a predetermined pigment in addition to an epoxy resin and a softening agent. In the present step, the epoxy resin powder coating containing softening agent for topcoating may be made to adhere to the undercoat film with the electrostatic coating method, the electrostatic fluidization dipping method, the fluidization dipping method and so on, similarly to the undercoating step.

Similarly to the undercoating step, in order to improve adhesiveness of an epoxy resin powder coating containing softening agent for topcoating, it is desirable that the spring is heated to the predetermined temperature and is made to adhere to the surface in the state that the powder coating is melted. For example, it is preferable that the present step is carried out at the temperature of 60° C. or above and 160° C. or below. When the preheating step is carried out prior to the undercoating step, residual heat in the preheating step may be utilized for heating the spring. Furthermore, rising the temperature may be carried out separately.

The coating film formed by the present method for coating includes a softening agent, so it has high chipping resistance. Due to this, it is possible to make the thickness of the topcoat layer thin. By making the thickness thin, for example, it is possible to lower the temperature of the present step, furthermore, the temperature of the preheating step. By the way, when the spring is heated at the temperature of approximately 180° C. in the preheating step, and the undercoating step and the present step are carried out continuously, the temperature of the surface of the spring in the present step becomes 120 to 140° C. although it depends on the circumstance of coating. For example, when the temperature of the present step is lowered to be 60° C. or above and 80° C. or below, it is satisfactory that the spring is heated to the temperature of approximately 120° C. in the preheating step. By lowering the temperature for heating the spring, it is possible to reduce the cost for coating. Furthermore, when the epoxy resin powder coating containing softening agent is produced by the dry blend method, the characteristics of the softening agent is further exhibited by lowering the temperature, and the impact resistance is further improved. Thus, by carrying out the present step at lower temperature in the present step, it is possible that the preheating step is carried out at the temperature of 70° C. or above and 120° C. or below.

(3) Baking Step

The "undercoat film" in the present step can also take various states, as disclosed in the above described topcoating step. By carrying out the present step, the undercoat layer and the topcoat layer are formed.

The baking temperature is not limited specifically, but the temperature of 160° C. or above and 220° C. or below will do. The baking time of approximately 20 minutes will do. And baking may be carried out with normally available electric ovens, angled ovens and so on.

In summarizing the above, an embodiment which is suitable for a method of coating of the present invention includes a pretreating step of previously forming a phosphate film on an uncoated surface of a spring, a preheating step of preheating the spring on which the phosphate film is formed at the temperature of 70° C. or above and 180° C. or below, an undercoating step of making an epoxy resin powder coating containing softening agent for undercoating adhere to a surface of the spring, an epoxy resin powder coating containing softening agent for topcoating adhere to an undercoat film composed of an epoxy resin powder coating containing softening agent for undercoating, and a baking step of baking the undercoat film and the epoxy resin powder coating containing softening agent for topcoating adhered to the undercoat film at the temperature of 160° C. or above and 220° C. or below. By the way, in this embodiment, an intermediate heating step of heating the adhered epoxy resin powder coating containing softening agent for undercoating at the temperature of 90° C. or above and 180° C. or below is included between the undercoating step and the topcoating step.

In these embodiments, after making the epoxy resin powder coating containing softening agent for undercoating adhere to a surface of the spring, curing of the powder coating is made to proceed to some degree. By making the epoxy resin powder coating containing softening agent for topcoating adhere to the undercoat film in the state of semi-curing, and finally, by baking fully, adhesion between the undercoat layer and the topcoat layer to be formed is improved.

Furthermore, there is an embodiment which is suitable for a method of coating of the present invention includes a pretreating step of previously forming a phosphate film on an uncoated surface of a spring, a preheating step of preheating the spring on which the phosphate film is formed at the temperature of 70° C. or above and 180° C. or below, an undercoating step of making an epoxy resin powder coating containing softening agent for undercoating adhere to a surface of the spring, an underbaking step of baking the adhered epoxy resin powder coating containing softening agent for undercoating at the temperature of 160° C. or above and 220° C. or below, a topcoating step of making an epoxy resin powder coating containing softening agent for topcoating adhere to an undercoat film composed of an epoxy resin powder coating containing softening agent for undercoating, and a baking step of baking the undercoat film and the epoxy resin powder coating containing softening agent for topcoating adhered to the undercoat film at the temperature of 160° C. or above and 220° C. or below.

Examples

Various kinds of powder coatings containing an epoxy resin were used to form a two-layered coating film, chipping resistance and corrosion resistance of this coating film were evaluated. Each test will be explained as follows.

(1) Low-Temperature Shock Resistance Test

A test piece to which various kinds of coatings are applied was used, and impact resistance of the coating film at low temperatures was evaluated. A method of producing the test piece was as follows.

First, a film made of zinc phosphate was formed on a surface of a thin plate made of spring steel (SUP7) by a spraying method. Next, a two-layered coating film comprising an undercoat layer and a topcoat layer was formed on the formed zinc phosphate film. The component of the powder coating used for forming the two-layered coating film, and a method for producing the powder coating are shown in the following Table 1. After making a powder coating for undercoating adhere to each test piece, it was heated at the temperature of 115° C. for 15 minutes, thereby forming a film in the state of semi-curing. After that, a powder coating for topcoating was made to adhere, and baking was carried out at the temperature of 85° C. for 20 minutes.

TABLE 1

| | | | Test Piece No. | |
|---|---|---|---|---|
| | | | #11 | #12 |
| Powder Coating for Undercoating | Base Resin | | Epoxy Resin (F Type) (Epoxy Equivalent Weight 900-1000) | Epoxy Resin (Epoxy Equivalent Weight 800-900) |
| | Curing Agent | | Pyganide Type | Pyganide Type |
| | Zinc Powder | | 84 wt % | 76 wt % |
| | Softening Agent | | — | Urethane Beads: 9 wt % |
| | Manufacturing Method | | Melting Kneading Method | Dry Blend Method |
| Powder Coating for Topcoating | Base Resin | | Polyester Resin | Polyester Resin |
| | Curing Agent | | Epoxy Resin | Epoxy Resin |
| | Extender Pigment | | Calcium Carbonate (Undefined Shape) | Calcium Carbonate (Undefined Shape) |
| | Softening Agent | | — | Urethane Beads: 9 wt % |
| | Manufacturing Method | | Melting Kneading Method | Melting Kneading Method |

| | | Test Piece No. | | |
|---|---|---|---|---|
| | | #13 | #14 | #15 |
| Powder Coating for Undercoating | Base Resin | Epoxy Resin (Epoxy Equivalent Weight 800-900) | Epoxy Resin (Epoxy Equivalent Weight 875-975) | Epoxy Resin (Epoxy Equivalent Weight 875-975) |
| | Curing Agent | Pyganide Type | Phenol Type | Phenol Type |
| | Zinc Powder | 76 wt % | 76 wt % | 73 wt % |
| | Softening Agent | Urethane Beads: 9 wt % | Urethane Beads: 9 wt % | Acrylic Beads: 2.3 wt % |
| | Manufacturing Method | Dry Blend Method | Dry Blend Method | Melting Kneading Method |
| Powder Coating for Topcoating | Base Resin | Polyester Resin | Epoxy Resin (Epoxy Equivalent Weight 875-975) | Epoxy Resin (Epoxy Equivalent Weight 875-975) |
| | Curing Agent | Epoxy Resin | Phenol Type | Phenol Type |
| | Extender Pigment | Calcium Carbonate (Undefined Shape) | Calcium Carbonate (Undefined Shape) | Calcium Carbonate (Undefined Shape) |
| | Softening Agent | Urethane Beads: 9 wt % | Urethane Beads: 9 wt % | Urethane Beads: 6.3 wt % |
| | Manufacturing Method | Dry Blend Method | Dry Blend Method | Melting Kneading Method |

As for five kinds of the produced test pieces, an impact resistance test was carried out at the temperature of −30° C. The impact resistance test was carried out in accordance with JIS K 5600 5-3 Dupont type. As a result, as for the test piece No. 11 in which a two-layered coating film was formed by a powder coating not containing a softening agent, crack was observed on the surface of the coating film at steel ball falling height of 40 cm. On the contrary, as for the test pieces No. 12 to No. 15 in which a coating film was formed by a powder coating containing a softening agent (an epoxy resin powder coating containing softening agent), crack was not observed on the surface of the coating film at steel ball falling height of 40 cm. Especially, as for the test pieces No. 13 and No. 14 in which both of a coating film for undercoating and a coating film for topcoating were produced by a dry blend method, crack was not observed on the surface of the coating film at steel ball falling height of 50 cm. Thus, by containing the softening agent, the impact resistance of the coating film at low temperatures was improved. Furthermore, the epoxy resin powder coating containing softening agent was produced by the dry blend method, so the impact resistance is further improved.

(2) Low-Temperature Endurance Test

A coil spring to which various kinds of coatings are applied was used, and durability at low temperatures was evaluated. A method of coating the coil spring was as follows.

First, a film made of zinc phosphate was formed on an uncoated surface of a coil spring produced by SUP7 (wire diameter: 13.9 mm, winding diameter: 136 mm, load: 1.0 to 2.9 (kN)). Next, the coil spring was placed in a coating line, and it was heated at the temperature of 120° C. for 10 minutes to be dried. Then, by using residual heat, a powder coating for undercoating was made to adhere to a surface of the coil spring. As the powder coating for undercoating, four kinds of powder coatings used for each of the test pieces No. 11, No. 13, No. 14 and No. 15, which were shown in Table 1, were used. Furthermore, a powder coating for topcoating was made to adhere to a surface of the formed undercoat film. As the powder coating for topcoating, four kinds of powder coatings used for each of the test pieces No. 11, No. 13, No. 14 and No. 15, which were shown in Table 1, were used. Here, a combination of the powder coating for topcoating and the powder coating for undercoating was the same as that of each of the above test pieces. Finally, the coil spring was heated at the temperature of from 180 to 185° C. for 25 minutes, and the baking was carried out. Each of thus coated coil springs was made to correspond to the above Table 1 to be used as each of the coil springs No. 11, No. 13, No. 14 and No. 15. Furthermore, the coil spring No. 11 is Comparative Example of the present invention.

Here, the film thickness of the undercoat layer of the coil spring No. 11 was approximately 60 μm, and the film thickness of the topcoat layer was from 400 to 500 μm. The surface roughness was $R_a$0.4 μm, $R_{zjis}$1.5 μm in axial direction and $R_a$0.7 μm, $R_{zjis}$8 μm in circumferential direction. The film thickness of the undercoat layer of the coil spring No. 13 was approximately 70 μm, and the film thickness of the topcoat layer was from 180 to 200 μm. The surface roughness was $R_a$1.03 μm, $R_{zjis}$8.70 μm in axial direction and $R_a$1.41 μm, $R_{zjis}$12.30 μm in circumferential direction. The film thickness of the undercoat layer of the coil spring No. 14 was from 50 to 100 μm, and the film thickness of the topcoat layer was from 400 to 500 μm. The surface roughness was $R_a$0.8 μm, $R_{zjis}$5.3 μm in axial direction and $R_a$1.5 μm, $R_{zjis}$21 μm in circumferential direction. The film thickness of the undercoat layer of the coil spring No. 15 was from 50 to 100 μm, and the film thickness of the topcoat layer was from 400 to 500 μm. The surface roughness was $R_a$0.6 μm, $R_{zjis}$5.7 μm in axial direction and $R_a$0.84 μm, $R_{zjis}$7 μm in circumferential direction.

As for each of the coated coil springs, a low-temperature endurance test was carried out. In the low-temperature endurance test, first, a low-temperature chipping resistance test was carried out, and then, a corrosion test and a low-temperature vibration test were alternatively carried out repeatedly. The low-temperature chipping resistance test used a gravelo testing machine (gravelometer). Several hundred grams of pebbles were collided against the coil spring which was cooled down to approximately −30° C. In the corrosion test, after spraying salt water (NaCl concentration: 5%) to each of the coil springs, they were subjected to forced drying, and furthermore, after immersing these coil springs into salt water (NaCl concentration: 50), they were subjected to air drying. The cycle such as salt water spraying, forced drying, salt water immersing and air drying was carried out for 5 cycles in total. In the low-temperature vibration test, the coil spring was attached to a vibration apparatus, and it was vibrated at the temperature of −30° C. At this time, scattering sand for coating damage was scattered in a lower sheet groove portion where a lower sheet of the coil spring was placed. The number of times for repeating the corrosion test and the low-temperature vibration test was 100 cycles.

As a result of the low-temperature durability test, as for the coil spring No. 11 in which a two-layered coating film was formed by a powder coating not containing a softening agent, it has been confirmed that rust was generated after carrying out 35 cycles. On the contrary, as for the coil springs No. 13, No. 14 and No. 15 in which a coating film was formed by a powder coating containing a softening agent (an epoxy resin powder coating containing softening agent), rust was hardly generated, and they were not broken. Thus, since a softening agent is contained in the coating film, the chipping resistance and the corrosion resistance at low temperatures are improved, and as a result, the durability of the spring is improved.

Having now fully described the present invention, it will be apparent to one of ordinary skill in the art that many changes and modifications can be made thereto without departing from the spirit or scope of the present invention as set forth herein including the appended claims.

What is claimed is:

1. A spring with high durability having a two-layered coating film comprising an undercoat layer and a topcoat layer which is formed on said undercoat layer, wherein at least one of said two layers is composed of an epoxy resin powder coating comprising an epoxy resin and a thermoplastic urethane resin softening agent for improving impact resistance of said coating film.

2. A spring with high durability as claimed in claim 1, wherein said undercoat layer comprises said epoxy resin powder coating, and the epoxy resin powder coating further comprises zinc.

3. A spring with high durability as claimed in claim 2, wherein the content of said zinc is 75 wt % or more to 100 wt % of the total weight of said epoxy resin powder coating.

4. A spring with high durability as claimed in claim 1, wherein said topcoat layer has a thickness of 200 μm or more and 600 μm or less.

5. A spring with high durability as claimed in claim 1, wherein a phosphate film is formed under said undercoat layer.

6. A method of coating a spring with high durability, which comprises:
    a coating step of adhering an epoxy resin powder coating comprising an epoxy resin and a thermoplastic urethane resin softening agent for improving impact resistance of a coating film adhered to a surface on which said coating film is formed; and
    a baking step of baking said epoxy resin powder coating adhered to said surface.

7. A method for making the spring of claim 1, which comprises:
    an undercoating step of adhering a powder coating for undercoating to a surface of said spring;
    a topcoating step of adhering a powder coating for topcoating to an undercoat film comprising said powder coating for undercoating; and
    a baking step of baking said undercoat film and said powder coating for topcoating adhered to said undercoat film; wherein at least one of said powder coating for undercoating and said powder coating for topcoating is an epoxy resin powder coating comprising an epoxy resin and a thermoplastic urethane resin softening agent for improving impact resistance of a coating film.

8. The method as claimed in claim 7, further comprising a preheating step of preheating said spring to 70° C. or above and 120° C. or below, before said undercoating step.

9. The method as claimed in claim 8, wherein said topcoating step is carried out at a temperature of 60° C. or above and 80° C. or below by using residual heat of said preheating step.

10. The method as claimed in claim 7, further comprising a pretreating step of previously forming a phosphate film on an uncoated surface of said spring, before said undercoating step.

11. The method as claimed in claim 7, further comprising an underbaking step of baking said powder coating for undercoating adhered to said surface, between said undercoating step and said topcoating.

12. A spring having a two-layered coating film comprising an undercoat layer and a topcoat layer present on said undercoat layer, wherein at least one of said two layers comprises an epoxy resin powder coating comprising an epoxy resin and a thermoplastic urethane resin softening agent.

13. The spring as claimed in claim 12, wherein said undercoat layer comprises said epoxy resin powder coating, and said epoxy resin powder coating further comprises zinc.

14. The spring as claimed in claim 13, wherein the content of said zinc in the epoxy resin powder coating is from 75 wt % to 100 wt % of the total weight of the epoxy resin powder.

15. The spring as claimed in claim 12, wherein said topcoat layer has a thickness of from 200 μm to 600 μm.

16. The spring as claimed in claim 12, further comprising a phosphate film present under said undercoat layer.

17. A method of coating a spring, which comprises:
    coating the spring with an epoxy resin powder coating comprising an epoxy resin and a softening agent comprising a thermoplastic urethane resin; and then
    baking said spring coated with the epoxy resin powder coating.

18. A method for making the spring of claim 1 of coating a spring, which comprises:
    undercoating the spring with an undercoating powder coating to form an undercoated spring having an undercoat film;
    topcoating the undercoated spring with a topcoating powder coating to form a topcoated spring having a topcoat film;
    baking said topcoated spring to adhere the topcoat film and the undercoat film on said spring;
    wherein at least one of said undercoating powder coating and said topcoating powder coating is an epoxy resin powder coating comprising an epoxy resin and a softening agent comprising a thermoplastic urethane resin.

19. The method as claimed in claim 18, further comprising: preheating said spring to from 70° C. to 120° C., before said undercoating.

20. The method as claimed in claim 19, wherein said topcoating is carried out at a temperature of from 60° C. to 80° C. with the residual heat of said preheating.

21. The method of coating a spring as claimed in claim 18, further comprising forming a phosphate film on an uncoated surface of said spring, before said undercoating.

22. The method as claimed in claim 18, further comprising: baking said undercoating powder coating between said undercoating and said topcoating.

23. The spring as claimed in claim 1, wherein the epoxy resin powder coating comprises from 5 wt % to 15 wt % of the thermoplastic urethane resin softening agent based on the total weight of the epoxy resin powder coating.

24. The spring as claimed in claim 23, wherein the epoxy resin powder coating is produced by a dry blend method.

25. The method as claimed in claim 6, wherein the epoxy resin powder coating comprises the thermoplastic urethane resin softening agent in an amount of from 5 wt % to 15 wt % based on the total weight of the epoxy resin powder coating.

26. The method as claimed in claim 25, wherein the epoxy resin powder coating is produced by a dry blend method.

27. The method of claim 7, wherein the epoxy resin powder coating comprises the thermoplastic urethane resin softening agent in an amount of from 5 wt % to 15 wt % based on the total weight of the epoxy resin powder coating.

28. The method according to claim 27, wherein the epoxy resin powder coating is produced by a dry blend method.

29. The method according to claim 17, wherein the epoxy resin powder coating comprises from 5 wt % to 15 wt % of the thermoplastic urethane resin based on the total weight of the epoxy resin powder coating.

30. The method according to claim 29, wherein the epoxy resin powder coating is produced by a dry blend method.

31. The method according to claim 18, wherein the epoxy resin powder coating comprises the thermoplastic urethane resin in an amount of from 5 wt % to 15 wt % based on the total weight of the epoxy resin powder coating.

32. The method according to claim 31, wherein the epoxy resin powder coating is produced by a dry blend method.

* * * * *